Ili(12) United States Patent
Hill et al.

(10) Patent No.: US 11,998,023 B2
(45) Date of Patent: Jun. 4, 2024

(54) MOULDED TEA COMPOSITION INCORPORATING MICROBIAL CELLULOSE AS A BINDER

(71) Applicant: ILOLA INC., Delta (CA)

(72) Inventors: Su-Mari Hill, Delta (CA); Timothy Peter Hill, Delta (CA)

(73) Assignee: Ilola Inc., Delta (CA)

( * ) Notice: Subject to any disclaimer, the term of this patent is extended or adjusted under 35 U.S.C. 154(b) by 371 days.

(21) Appl. No.: 17/205,986

(22) Filed: Mar. 18, 2021

(65) Prior Publication Data
US 2022/0295813 A1 Sep. 22, 2022

(51) Int. Cl.
A23F 3/14 (2006.01)
A23L 33/105 (2016.01)
A23L 33/135 (2016.01)
A23L 33/24 (2016.01)
A23P 30/10 (2016.01)

(52) U.S. Cl.
CPC .............. A23F 3/14 (2013.01); A23L 33/105 (2016.08); A23L 33/135 (2016.08); A23L 33/24 (2016.08); A23P 30/10 (2016.08)

(58) Field of Classification Search
None
See application file for complete search history.

(56) References Cited

U.S. PATENT DOCUMENTS

| 4,031,238 A | 6/1977 | Reid et al. | |
| 5,207,826 A * | 5/1993 | Westland | ........... A01G 13/0262 106/162.5 |
| 5,962,676 A * | 10/1999 | Tammarate | ................ C08L 1/00 536/127 |
| 2016/0023826 A1 | 1/2016 | Edwards et al. | |
| 2016/0135476 A1 | 5/2016 | Chandran | |
| 2020/0315202 A1 | 10/2020 | Avshalom | |

FOREIGN PATENT DOCUMENTS

| CN | 101258885 A | 9/2008 | |
| CN | 101586134 A * | 11/2009 | ................ A23F 3/14 |
| DE | 19927963 A1 | 12/2000 | |
| WO | 9311182 A1 | 6/1993 | |
| WO | 9501732 A1 | 1/1995 | |
| WO | 0105838 A1 | 1/2001 | |
| WO | 2004002235 A1 | 1/2004 | |
| WO | 2006085710 A1 | 8/2006 | |
| WO | 2016081512 A1 | 5/2016 | |
| WO | 2020136629 A1 | 7/2020 | |

OTHER PUBLICATIONS

Vigentini et al., "Set-Up of Bacterial Cellulose Production From the Genus Komagataeibacter and Its Use in a Gluten-Free Bakery Product as a Case Study"; Microbiol., Sep. 6, 2019 Sec. Food Microbiology vol. 10—2019 | https://doi.org/10.3389/fmich.2019.01953 (Year: 2019).*
Bigelow "Probiotic Tea 6 Flavor Variety Pack" pp. 4, cited date in the document is 2009. (Year: 2009).*
Barbara Estafania Artega "Composite of polylactic acid and microcellulose from kombucha membranes" Published by De Gruyter on Dec. 8, 2020 (Year: 2020).*
NPL to Dima et al "Bacterial Nanocellulose from Side-Streams of Kombucha Beverages Production: Preparation and Physical-Chemical Properties".*
International Search Report from counterpart PCT application No. PCT/CA2022/05033, dated May 18, 2022, 3 pgs.
Written Opinion from counterpart PCT application No. PCT/CA2022/05033, dated May 18, 2022, 3 pgs.
Arteaga-Ballesteros et al. "Composite of polylactic acid and microcellulose from kombucha membranes". De Gruyter, e-Polymers 2021; 21: pp. 15-26.
Matei et al. "Molecular Identification of Yeast Isolated From Different Kombucha Sources". AUDJG—Food Technology (2018), 42(1), 17-25.
Kruk et al. "Application of the "SCOBY" and Kombucha Tea for the Production of Fermented Milk Drinks". Microorganisms 2021, 9, 123, Jan. 7, 2021.
Kozyrovska et al. "Kombucha microbiome as a probiotic: a view from the perspective of post-genomics and synthetic ecology". Biopolymers and Cell. 2021. vol. 28. N 2: pp. 103-113.

* cited by examiner

Primary Examiner — Jyoti Chawla
(74) Attorney, Agent, or Firm — Greenberg Traurig, LLP

(57) ABSTRACT

A moulded tea composition is provided. The moulded tea composition is prepared from microbial cellulose as a binder and dehydrated plant material. The microbial cellulose may be kombucha membrane and the dehydrated plant material may be tealeaves. The moulded tea composition may include other ingredients and such ingredients may include probiotics and extracts. A method for preparing the moulded tea composition is also provided.

20 Claims, 2 Drawing Sheets

MOULDED TEA COMPOSITION INCORPORATING MICROBIAL CELLULOSE AS A BINDER

TECHNICAL FIELD

The present invention relates to a moulded tea composition and a method of making same. In some embodiments, the present invention relates to a moulded tea composition incorporating microbial cellulose as a binder for dehydrated plant material including tealeaves. In some embodiments, the microbial cellulose is kombucha membrane. Some embodiments relate to a method of making a moulded tea composition, wherein microbial cellulose is used as a binder for dehydrated plant material including tealeaves. Some embodiments relate to a method of re-purposing kombucha membrane that is often viewed as a waste by-product of the kombucha tea fermentation process.

BACKGROUND

The National Center for Health Statistics at the United States Centers for Disease Control and Prevention reported that between 2015 and 2018, tea accounted for a major part of the total non-alcoholic beverage consumption among adults. The National Geographic magazine reported that tea is the world's second most consumed non-alcoholic beverage, after water. The United Nations Food and Agriculture Organization 2014 data showed that about six billion cups of tea are consumed on a daily basis. The global consumption of tea continues to rise and one reason for this increase may be that people have become more aware of the potential health benefits associated with the consumption of tea.

Tea may be served in loose-leaf form or tea bags. Generally speaking, loose-leaf tea is considered to have a superior quality over tea bags. Loose-leaf tea includes whole, intact tealeaves that have a smaller surface area to volume ratio than that of broken tealeaves. During the brewing process, the smaller surface area of loose-leaf tea means that less surface area would be in contact with hot water and as such, different tea compounds would be slowly released into the hot water. Loose-leaf tea allows for multiple infusions to develop complex flavours and aromas without drawing out bitterness or astringency. The smaller surface area also means that less surface area would be exposed to the air and there would therefore be less oxidation-related quality deterioration during storage. Further, loose-leaf tea is rarely processed or packaged into tea bags because tea bags do not provide sufficient space for the tealeaves to unfurl during the brewing process. In other words, tea bags would not allow loose-leaf tea to release its full flavour attributes during the brewing process.

Tea bags are small, porous pouches that contain a pre-portioned amount of tealeaves therein. Tea bags offer a convenient and no-mess option for brewing tea. It is convenient to place a tea bag into a cup, a pot, or a mug to brew tea and it is also convenient to remove a brewed tea bag by lifting its handy attached string. There is no need for other tea-brewing equipment, e.g. a tea scoop and/or a scale (to measure the amount of loose-leaf tea to be brewed) or an infuser and/or a tea strainer (to remove the brewed loose tealeaves).

The convenience of tea bags may come with the sacrifice of quality. Brewed tea from tea bags is often considered by tea connoisseurs to be lower in quality, flavor complexity and aromas than brewed tea from loose-leaf tea. This is because manufacturers often fill the tea bags with the by-products from the processing of higher-grade tea. Such by-products include tea dust, fannings or broken tealeaves that are considered the lowest grade of tea. Tea bags may not store well and may release a high amount of tannins when brewed/steeped, making the brewed tea more bitter and astringent than their loose-leaf tea counterparts.

Some tea bags may be made of plastic materials. An example is pyramid-shaped nylon tea bags. These plastic tea bags have been developed to provide sufficient room for tealeaves to unfurl. However, they can shed billions of micro-plastics in a single cup. Also, plastics and petroleum glue are common materials used to seal tea bags, regardless of whether the tea bags are made of plastic materials or not. Unbeknown to consumers, tea bags can expose consumers to unwanted plastics and/or chemicals. Plastics in tea bags can also contribute to pollution.

In view of the different characteristics of loose-leaf tea and tea bags, there is a general desire for a tea composition (or product) that permits the integration of a high sensory quality typically afforded by loose-leaf tea and the convenience typically associated with tea bags. There is also a general desire for a tea composition (or product) that provides the convenience typically associated with tea bags without exposing consumers to unwanted plastics and chemicals.

Moulded tea, also known as compressed tea, tea bricks, tea cakes, tea lumps, and tea nuggets, may be an alternative to tea bags. Moulded tea was the most commonly produced and consumed form of tea in ancient China, although it is less commonly produced in modern times. To produce moulded tea, ground or whole tealeaves are steamed and then pressed into a solid form. The pressed solid form is then left to dry until a desired degree of moisture has been reached. Prior art moulded tea is often moulded in bulk sizes and can be inconvenient for tea brewing. A tea needle may be needed to loosen a piece off from the bulk-sized tightly-pressed moulded tea because breaking the moulded tea by hand is discouraged. Breaking the moulded tea by hand would tear and damage the tealeaves and expose the internal structure of the moulded tea to undesirable oxidation. The operation of a tea needle can be dangerous to an inexperienced user.

There is a general desire for a moulded tea composition (or product) that provides the convenience typically associated with tea bags without exposing consumers to unwanted plastics and chemicals. It may be desirable for the moulded tea composition to be pre-portioned so that each moulded tea composition contains a single-serving amount for brewing a cup or a pot of tea. There may also be a general desire for a moulded tea composition that provides enhanced health benefits in view of the pro-health trends in food production and consumption.

Kombucha tea drink is a fermented beverage and has often been marketed as a functional beverage for its health benefits. Kombucha tea's sensory profile is described as slightly sweet and lightly sour refreshing. It is fermented by symbiotic culture of bacteria and yeast ("SCOBY"), also known as kombucha membrane, tea mushroom, and tea fungus. Several studies have shown the potential health benefits of kombucha tea and kombucha membrane in vitro and in vivo animal studies. For example, kombucha tea has been reported to contain bioactive compounds that are metabolized by the kombucha membrane. Kombucha membrane has been reported to include probiotic bacteria. Kombucha membrane is a cellulosic biofilm formed by polymerization of monosaccharides and includes bacteria and yeast. Kombucha membrane is used as a starter culture for the production of kombucha tea. Other than its use as a starter culture, kombucha membrane has largely been considered as a waste by-product of the kombucha tea fermentation process.

There is a general desire for a method of re-purposing kombucha membrane into useful products.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention has a number of aspects. These include without limitation:
a moulded tea composition;
a method of making a moulded tea composition; and
a method of repurposing kombucha membrane into a tea composition.

A first aspect of the invention is directed to a new and useful moulded tea composition. Without being bound, some advantages that may be provided by some embodiments of the moulded tea include:
the moulded tea composition may permit the integration of a high sensory quality as is typically afforded by loose-leaf tea and the convenience typically associated with tea bags;
the moulded tea composition may provide the convenience typically associated with tea bags without exposing consumers to unwanted plastics and chemicals;
the moulded tea composition may allow tealeaves to fully unfurl during the brewing process;
the moulded tea composition may be pre-portioned to provide a single-serving size; and/or
the moulded tea composition may provide enhanced health benefits.

The moulded tea composition contains microbial cellulose as a binder for dehydrated plant material.

The microbial cellulose may be kombucha membrane. The kombucha membrane may contain probiotics and as such, when kombucha membrane is used as a binder, the moulded tea composition may contain probiotics.

The dehydrated plant material may include tealeaves.

The moulded tea composition may be pre-portioned to provide a single-serving size for brewing a cup or pot of tea.

Another aspect of the present invention is directed to a method of making a moulded tea composition.

The method includes combining microbial cellulose with dehydrated plant material to produce a mixture. The mixture is then moulded into a desired shape. The moulded mixture is then dried to make the moulded tea composition. The microbial cellulose may bind the dehydrated plant material and hold the dehydrated plant material in the desired shape.

Another aspect of the present invention is directed to a method of repurposing kombucha membrane that is often viewed as a waste by-product of the kombucha tea brewing process. The method uses kombucha membrane as a binder for dehydrated plant material.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
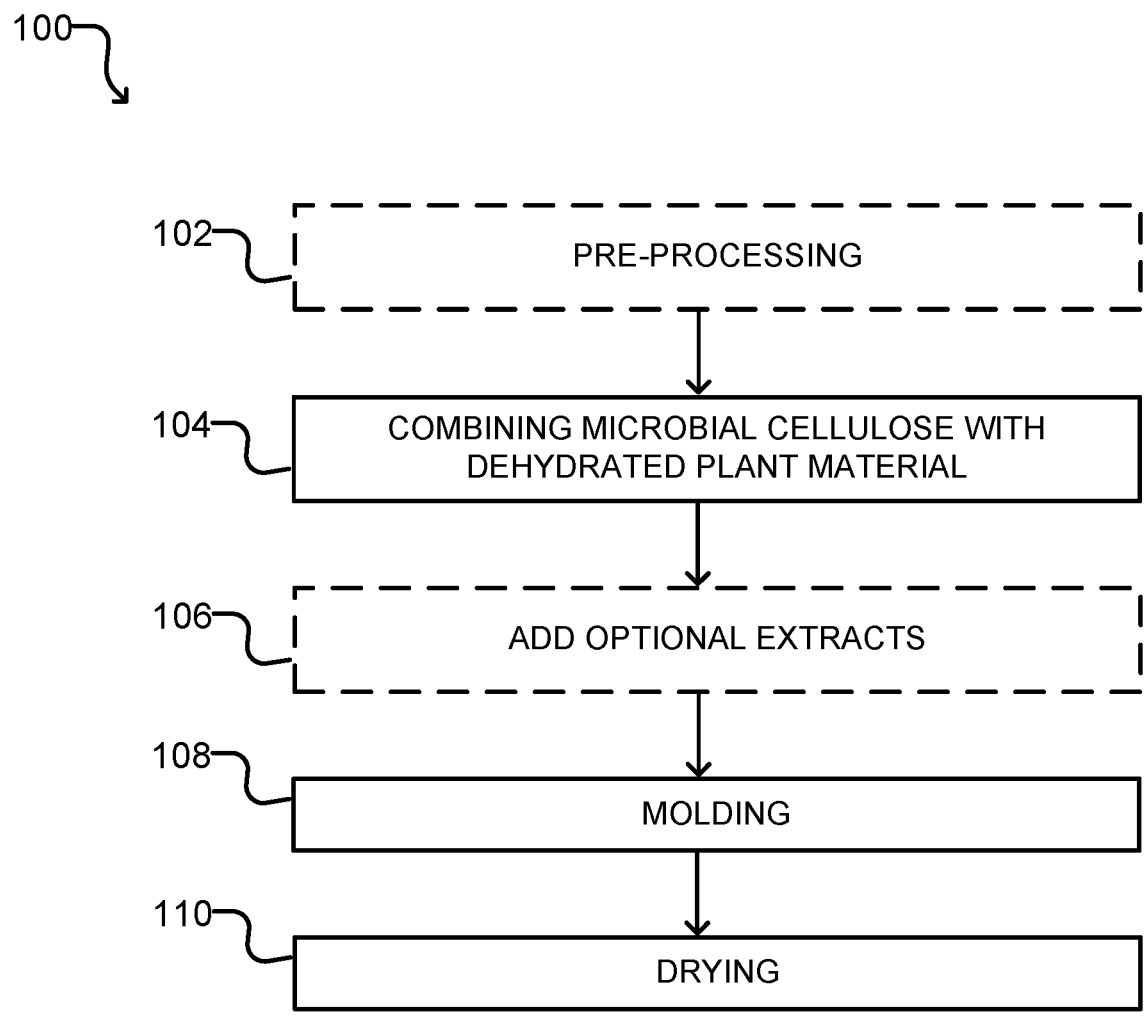
FIG. 1 is a flow diagram of an example embodiment of a method of making a moulded tea composition.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, the terms "about" or "approximately" mean a value within +/−10% of the stated value unless specified otherwise. Either one of these terms "about" or "approximately" connotes that strict compliance with the numeric value recited is not critical. Some variation is permissible and still within the scope of the various embodiments described herein.

As used herein, the term "plant material" includes any plant tissue, organ or part, including leaves, stems, tubers, roots, flowers, pollens, seeds, fruits, and the like.

As used herein, the terms "dehydrated" and "dried" are used in contrast to "fresh". For example, "dehydrated plant material" refers to plant material that has undergone a drying step to remove a portion or all of the available free water.

Dehydrated plant material includes "tealeaves". As used herein, the term "tealeaves" includes dehydrated stems, leaves, buds, and/or flowers of tea plant (*Camellia sinensis*), despite the degrees of fermentation or oxidation. "Tealeaves" also includes dehydrated stems, leaves, buds and/or flowers of other botanical plants, such as *Aspalathus lineari, Cyclopia intermedia, Cyclopia genistoides, Cyclopia maculate, Cyclopia sessiliflora, Cyclopia subternata, Cyclopia longifolia*, mint, and chamomile. Tealeaves may be whole or broken. Tealeaves may be used to brew all different types of tea drinks including black, green, herbal, hibiscus, matcha, oolong, pu'erh, rooibos, truffle, yellow, yerba mate, and white tea.

As used herein, the terms "tea" and "tea composition" refer to any product that includes dehydrated plant material and that can be brewed to make tea drinks, such as black, green, herbal, hibiscus, matcha, oolong, pu'erh, rooibos, truffle, yellow, yerba mate, and white tea. To distinguish "tea" from a drink that is prepared from "tea", the drink may be referred to as a tea drink, a tea beverage, or brewed tea. Some tea compositions may include a combination of tealeaves and other additives, such as spices, dried fruits, seeds, and/or extracts. Some tea compositions may only include tealeaves. Some tea compositions may not include any tealeaves. For example, such tea compositions may only include dehydrated plant material that is not tealeaves, e.g. dried fruits and extracts for brewing a fruit tea drink.

As used herein, the expression "tea blending" or its noun form "a blend of tea" or "tea blend" refers to the blending of different ingredients to create a tea composition with a specific taste and/or aroma profile. A tea blend may be formulated by a tea expert.

As used herein, the term "extracts" means "flavor extracts" and/or "botanical extracts".

The term "flavour extracts" refers to any substance that may be added to create a desired flavour profile. Flavour extracts may have some nutritional value although this is not necessary. Flavour extracts may be natural flavourings that fall under the U.S FDA Code of Federal Regulations (Title 21, Vol. 2, Sec. 101.22.3). Flavour extracts may be in any suitable form, e.g. liquid or powder. Some example flavour extracts include coffee flavorings, chocolate flavorings, chai flavorings, blueberry flavorings, caramel flavoring, peach flavorings, orange flavorings, raspberry flavorings, rose flavorings, strawberry flavorings, lemon flavorings, vanilla essences, passionfruit flavorings, peppermint flavorings, mango flavorings, and maple extracts.

The term "botanical extracts" refers to any substance extracted from plants including vegetative material of medicinal plants. Botanical extracts may be in any suitable form, e.g. liquid or powder. Some example botanical extracts include plant metabolites, such as alkaloids, flavonoids, glycosides, saponins, terpenes, and plant steroids. Some example botanical extracts include green tea extracts, rosavin from *Rhodiola rosea, Ginkgo biloba* extract, and *Panax ginseng* extract.

As used herein, the term "probiotics" (from pro and biota, meaning "for life") refers to living microorganisms that can confer health benefits when adequate amounts are consumed. Example probiotics include lactic acid bacteria ("LAB"), such as *Lactobacillus, Lactococcus, Streptococcus, Oenococcus, Pediococcus, Leuconostoc, Enterococcus,* and *Bifidobacterium*. Example probiotics include certain yeast strains, such as *Saccharomyces cerevisiae*. Example probiotics include certain mold strains, such as *Aspergillus oryzae* and *Aspergillus niger.*

As used herein, the term "kombucha tea" or "kombucha tea drink" refers to a fermented beverage that is slightly sweet and lightly sour refreshing. Kombucha tea is the fermentation product of a sweet tea solution. The sweet tea solution may be brewed tea that has been sweetened with sugar. The brewed tea may be prepared from herbal tea, including roots, herbs, fruits, and/or shrubs (like rooibos and honey bush). The brewed tea may be prepared from white, yellow, black, green, oolong, or pu'erh tea. The brewed tea may be prepared from a blend of any suitable tea varieties. The brewed tea may be prepared from any plant variations that is safe for human consumption and may include dried leaves or buds of the shrub *Camellia sinensis*. Sugar may be any suitable sugar, including sucrose, glucose, and/or fructose. Suitable sugar includes high fructose corn syrup, agave, beet sugar, blackstrap molasses, brown sugar, buttered syrup, cane juice crystals, cane sugar, caramel, carob syrup, castor sugar, coconut sugar, confectioner's sugar (powdered sugar), date sugar, demerara sugar, Florida crystals, fruit juice, fruit juice concentrate, golden sugar, golden syrup, grape sugar, honey, icing sugar, invert sugar, maple syrup, molasses, muscovado sugar, panela sugar, rapadura, raw sugar, refiner's syrup, sorghum syrup, sucanat, treacle sugar, turbinado sugar, yellow sugar, barley malt, brown rice syrup, corn syrup, corn syrup solids, dextrin, dextrose, diastatic malt, ethyl maltol, glucose, glucose solids, lactose, malt syrup, maltodextrin, maltose, rice syrup, crystalline fructose, fructose, D-ribose, galactose, and/or yacon syrup.

The fermentation process is carried out by a fermentation starter (that may be an older batch of a successful kombucha tea) and symbiotic culture of bacteria and yeast ("SCOBY"). The fermentation process typically lasts for a couple of weeks.

SCOBY is also known as kombucha membrane, tea mushroom, tea fungus, and Manchurian mushroom, because its similar shape and appearance to the fruiting caps of macroscopic mushrooms. The term "kombucha membrane" is more often used in this application compared to the other equivalent terms and there is no particular reason for this preference. As discussed, kombucha membrane is used as a starter culture for the production of kombucha tea. Other than its use as a starter culture, kombucha membrane has largely been considered as a waste by-product of the kombucha tea fermentation process. Kombucha membrane is a cellulosic biofilm formed by polymerization of monosaccharides and is home to microflora that may include bacteria, such as acetic acid bacteria ("AAB"), LAB and bifidobacteria, and yeast. Kombucha membrane is often formed at or near the surface of a fermenting kombucha tea broth. Typically, kombucha membrane appears to be a thick, white-gelatinous-like pellicle. *Acetobacter* microorganisms are believed to contribute to the formation of kombucha membrane. Kombucha membrane is organic and possesses high tensile strength as well as a high-water holding capacity.

As used herein, the terms "microbial-derived cellulose" and "microbial cellulose" refer to cellulose produced by microorganisms. Example microbial cellulose includes bacterial cellulose formed by linkage of β-1,4 glucosidic bonds between carbon atoms, which may be produced by bacteria of the Acetobacterium (e.g. *Acetobacter xylinum* and *Gluconacetobacter xylinum*), *Rhizobium, Alcaligenes, Agrobacterium,* and *Pseudomonas* type. Example microbial cellulose includes kombucha membrane.

The inventors have found that microbial cellulose, including kombucha membrane, can function as a binding agent to bind dehydrated plant material including tealeaves, and form a moulded tea composition. Based on this, the inventors have invented a moulded tea composition incorporating microbial cellulose as a binder for dehydrated plant material including tealeaves. The inventors have also invented a method of making the moulded tea composition.

In some embodiments, the moulded tea composition permits the integration of a high sensory quality as is typically afforded by loose-leaf tea and the convenience typically associated with tea bags. In some embodiments, the moulded tea composition provides the convenience typically associated with tea bags without exposing consumers to unwanted plastics and chemicals. For example, the moulded tea composition may be pre-portioned to provide a single-serving size for brewing either a cup or a pot of tea.

In some embodiments, the moulded tea composition includes tealeaves and the moulded tea composition allows the tealeaves to fully unfurl during the brewing process.

In some embodiments, the microbial cellulose is kombucha membrane. As such, the moulded tea composition repurposes kombucha membrane, which has largely been considered to be a waste by-product of the kombucha tea fermentation process, into a useful product. When kombucha membrane is used as a binding agent to make a moulded tea composition, the kombucha membrane microflora, including probiotics such as LAB, bifidobacteria, and the like, may be present in the moulded tea composition and may provide enhanced health benefits.

A moulded tea composition according to a first embodiment of the present invention includes microbial cellulose as a binder for dehydrated plant material.

The amount of microbial cellulose that functions as a binder in the moulded tea composition is in the range of about 0.1%-20% (w/w on a dry matter basis), including any value therebetween, e.g. 0.5%, 1%, 2%, 3%, 4%, 5%, 6%, 7%, 8%, 9%, 10%, 11%, 12%, 13%, 14%, 15%, 16%, 17%, 18%, and 19%. The ratio of microbial cellulose to dehydrated plant material that is present in the moulded tea composition may vary depending on the desired tea blend, the characteristics of the microbial cellulose, and the conditions used to prepare the moulded tea composition. For example, some dehydrated plant material may contain a higher portion of fine and porous ingredients and such dehydrated plant material may require a higher ratio of microbial cellulose to dehydrated plant material. This is because such dehydrated plant material would absorb a larger amount of water/moisture and require a larger amount of microbial cellulose than dehydrated plant material containing a lower portion of fine and porous ingredients. If an insufficient amount of microbial cellulose is combined with dehydrated plant material or premature drying occurs once the microbial cellulose has been combined with the dehydrated plant material, the eventually-formed moulded tea composition may not hold its shape and may crumble. Overall, there should be a sufficient proportion of microbial cellulose present as a binder to provide the moulded tea composition with a reasonable degree of mechanical stability (e.g. to hold a desired shape). Further, there should not be an excessive proportion of microbial cellulose that would negatively affect the sensory quality of a brewed tea drink from the moulded tea composition.

The microbial cellulose has been reported to have a relatively high water holding capacity. For example, Rebelo et al. in Dehydration of bacterial cellulose and the water content effects on its viscoelastic and electrochemical properties in Science and Technology of Advanced Materials, 19(1), 203-211, reported that microbial cellulose may retain large amounts of water—around 98% and 99% on a wet basis.

Hussain et al. in Production of bacterial cellulose from industrial wastes: a review. *Cellulose*, 26(5), 2895-291, studied microbial cellulose produced from microbial fermentation. They reported that microbial cellulose produced from microbial fermentation has similar physicochemical properties, regardless of the fermentation and growth media used. As such, they concluded that microbial cellulose would likely work in the same way and would likely have similar industrial applications.

The microbial cellulose may be the mother of vinegar, a cellulose substance containing acetic acid bacteria. The mother of vinegar develops during the vinegar fermentation process. Vinegar may include apple cider vinegar.

The microbial cellulose may be kombucha membrane, which may be a waste by-product of the kombucha tea fermentation process. The inventors found that kombucha membrane has a high water holding capacity—around 98% and 99% on wet basis. The kombucha membrane may contain microflora that includes probiotics, such as LAB and bifidobacteria. The SCOBY microflora composition may vary, although it usually comprises acetic acid bacteria and yeast. Some bacterial genera that may be found in the kombucha membrane include *Gluconacetobacter, Acetobacter, Lactobacillus* (some species within this genus may be classified as probiotics), *Bifidobacterium* (some species within this genus may be classified as probiotics), *Lactococcus* (some species within this genus may be classified as probiotics), and *Leuconostoc*. Some yeast genera that may be found in the kombucha membrane include *Schizosaccharomyces, Brettanomyces, Saccharomyces* (some species within this genus may be classified as probiotics), and *Zygosaccharomyce*.

The kombucha tea membrane may be subject to a pre-processing step including washing, size reduction and/or drying. The size reduction step may involve mechanical shearing and may turn the kombucha membrane into a mouldable form, such as a puree form or a paste form. After the size reduction step, the average particle size of the kombucha membrane may be reduced to between about 10 μm and about 1000 μm.

The amount of dehydrated plant material present in the moulded tea composition is between about 80% to about 99.9% (w/w on a dry matter basis), including any value therebetween, e.g. about 81%, 82%, 83%, 84%, 85%, 86%, 87%, 88%, 89%, 90%, 91%, 92%, 93%, 94%, 95%, 96%, 97%, 98%, 99%, and 99.5%.

The dehydrated plant material may include tealeaves. The dehydrated plant material may not include any tealeaves.

To create a tea blend with a particular flavour and/or sensory profile, an extract may be added. For example, a flavour extract and/or a botanical extract may be added to and mixed with the dehydrated plant material before the dehydrated plant material is combined with the microbial cellulose. A flavour extract and/or a botanical extract may be added to and mixed with the microbial cellulose before the microbial cellulose is combined with the dehydrated plant material. A flavour extract and/or a botanical extract may be added after the dehydrated plant material is combined with the microbial cellulose. A flavour extract and/or a botanical extract may be added when the dehydrated plant material is being combined with the microbial cellulose.

The moulded tea composition may include other ingredients such as macronutrients, micronutrients, and/or trace minerals so that the moulded tea composition can have a desired nutritional profile.

The moulded tea composition may include probiotics. The probiotics may be provided by kombucha membrane if the kombucha membrane is used as a binder for binding dehydrated plant material. Additional probiotics may be added, even if kombucha membrane is used as a binder and the kombucha membrane microflora is present as probiotics in the moulded tea composition.

The moulded tea composition may be pre-portioned to provide a single-serving size for brewing either a cup or a pot of tea.

The moulded tea composition may be of any desired shapes, including a cylindrical disc, a cone, a sphere, a cube, a rectangular prism, and the like. The moulded tea composition may be of a bar shape configured to allow squares to be broken off. Each square may provide a single-serving portion for brewing a cup of tea.

When the moulded tea composition includes tealeaves, the moulded tea composition may allow the tealeaves to fully unfurl during the brewing process. When the moulded tea composition is steeped in hot water of about 75° C. to about 105° C., the microbial cellulose may disperse in the hot water. This frees the tealeaves from being bound with one another by the microbial cellulose. As such, once the microbial cellulose has dispersed in hot water, the tealeaves can then fully unfurl during the brewing process.

A method 100 of making a moulded tea composition is shown in FIG. 1. Method 100 uses microbial cellulose as a binder for binding dehydrated plant material.

At step 102, if necessary or desirable, the microbial cellulose is subject to a pre-processing step, for example, washing, particle size reduction, drying or the like.

When kombucha membrane is used as the microbial cellulose, the kombucha membrane may be rinsed with water to remove any yeast agglomerates from its surface.

The kombucha membrane may be subject to a particle size reduction step so that the average particle size of the kombucha membrane is reduced to between about 10 μm and about 1000 μm, including any value there between, e.g. 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 95 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, and 950 μm. The size reduction step may deploy mechanical force to break down particles into smaller sizes. For example, mechanical shearing may be used to break the kombucha membrane into a mouldable form, such as a puree or paste form. The mechanical shearing may be created by a homogenizer (e.g. a high-pressure homogenizer), an impeller (e.g. a food processor) or a blender. The size reduction step may use any other suitable equipment and/or employ any other suitable processes.

The size reduction step may deploy a blender. The kombucha membrane may be cut into smaller pieces that would better fit into the blender and aid the blending process. Water may be added to the blender to improve the efficiency of the blending process. For example, a ratio of about 1:1 to 1:5 of water to kombucha membrane in weight may lower the viscosity of the blended kombucha membrane. This may help to prevent the formation of air pockets between the kombucha membrane and blender blades during the blending process. Formation of air pockets may cause the kombucha membrane to suspend above the blender blades and halt the blending process.

If water is added during the size reduction step, a drying step may be desirable. For example, if water is added to the blender, the blended kombucha membrane may be poured onto a mesh filter and at least some water present in the blended kombucha would be removed. A fine double mesh filter may be used. The duration of the draining/drying process may be about 15 minutes to about one hour. In some embodiments, the mesh filter sizes may be smaller than the average particular size of the blended kombucha membrane so that only water may pass through the filters.

The microbial cellulose that has been subject to a pre-processing step may be referred to as pre-processed microbial cellulose. Similarly, the kombucha membrane that has been subject to a pre-processing step may be referred to as pre-processed kombucha membrane.

At step 104, the microbial cellulose (or pre-processed microbial cellulose, if applicable) that will act as a binder is combined with dehydrated plant material.

The dehydrated plant material may be selected to provide a particular flavour, appearance, and/or sensory profile. The dehydrated plant material may include tealeaves. For example, the dehydrated plant material may include green tea (leaf tea), ginger (herb), burdock root (herb), lemongrass (herb), dandelion root (herb), and turmeric (herb). The dehydrated plant material may not include any tealeaves.

Different dehydrated plant ingredients are weighed and mixed until they are relatively evenly distributed to provide a generally homogeneous tea blend. The expression "evenly distributed" should not be understood in a strict sense. Instead, it may be understood to mean that a consumer would not detect a difference in flavour of a tea drink brewed from one theoretical portion of the tea blend to another theoretical portion of the tea blend.

The amount of microbial cellulose that functions as a binder relative to the amount of dehydrated plant material should be sufficient to provide the eventually-formed moulded tea composition with a reasonable degree of mechanical stability (e.g. to hold a desired shape). However, the amount of microbial cellulose should not be excessive such that it would negatively affect the sensory quality of a brewed tea drink from the eventually-formed moulded tea composition.

The ratio of the microbial cellulose to the dehydrated plant material may be between 0.5:1 to 10:1 on a wet basis and before the mixture is dried to form the moulded tea composition. The ratio may vary depending on the characteristics of the dehydrated plant material, the moisture content of the microbial cellulose, and the conditions used to prepare the moulded tea composition(s). For example, some dehydrated plant material may contain a higher portion of fine and porous ingredients and such dehydrated plant material may require a higher ratio of microbial cellulose to hold the dehydrated plant material together in a desired shape. This may be because such dehydrated plant material would absorb a larger amount of water/moisture and require a larger amount of microbial cellulose than dehydrated plant material containing a lower portion of fine and porous ingredients. If an insufficient amount of microbial cellulose is combined with dehydrated plant material or premature drying occurs once the microbial cellulose has been combined with the dehydrated plant material, the eventually-formed moulded tea composition(s) may crumble and/or may not have a reasonable degree of mechanical stability to hold a desired shape. In some embodiments, a ratio of 0.25:1 of the microbial cellulose to the dehydrated plant material may not provide a sufficient amount of microbial cellulose to hold the dehydrated plant material together in a desired shape.

On the flip side, the amount of microbial cellulose should not be excessive. In some embodiments, a ratio of 5:1 of the microbial cellulose to the dehydrated plant material may not negatively affect the sensory quality of a brewed tea drink from the eventually-formed moulded tea composition. However, a ratio of 5:1 or higher may lead to some undesirable aesthetic features of the eventually-formed moulded tea composition. For example, a ratio of 5:1 or higher may result in a plastic look and feel of the eventually-formed moulded tea composition, which may not be an attractive feature to a tea product.

The microbial cellulose (or pre-processed microbial cellulose, if applicable) and the dehydrated plant material are mixed to provide a generally homogeneous mix, which is referred to as the cellulose-plant-material mixture.

At step 106, additional ingredients, such as flavour extracts, botanical extracts, probiotics, macronutrients, micronutrients, and/or trace minerals may be added. Step 106 may occur simultaneously with, after, or before step 104. For example, to create a tea blend with a particular flavour and/or sensory profile, an extract may be (a) added to and mixed with the dehydrated plant material before the dehydrated plant material is combined with the microbial cellulose; (b) added to and mixed with the microbial cellulose before the microbial cellulose and the dehydrated plant material are mixed; (c) added to the cellulose-plant-material mixture; or (d) mixed with the dehydrated plant material and the microbial cellulose when the dehydrated plant material is being mixed with the microbial cellulose. As will be discussed later, step 106 (or another step to add additional ingredients) may occur at a later stage of method 100. For example, step 106 (or another step to add additional ingredients) may occur after a moulded tea composition has been formed. For example, an extract may be sprayed onto the moulded tea composition.

At step 108, the cellulose-plant-material mixture is moulded into a desired shape.

Step 108 may be carried out by packing/placing the cellulose-plant-material mixture into mold(s). The shape of the mold determines the dimensions and shape of the eventually-formed moulded tea composition(s). The mold(s) may be shaped in various three-dimensional geometric configurations, including cylindrical disc, cone, sphere, cube, rectangular prism, heart, star, and the like. The mold(s) may have a bar shape with break lines so that the eventually-formed moulded tea composition is configured to allow squares to be broken off. Each square may provide a single-serving portion for brewing a cup of tea. The mold(s) may be made of any suitable material, including silicon.

The cellulose-plant-material mixture may be packed into mold(s) right after step 106 so that premature drying is minimized.

The cellulose-plant-material mixture may be compressed and tightly packed into mold(s). The compression step may remove gas (e.g. air bubbles) from the cellulose-plant-material. Without the compression step, gas may lead to the formation of voids in the eventually-formed moulded tea composition(s). Such voids may weaken the structural integrity and result in fragility of the moulded tea composition(s).

At step 110, the cellulose-plant-material mixture contained in the mold(s) is dried to a sufficient extent to reduce the moisture content of the mixture and to allow the microbial cellulose to bind the dehydrated plant material. The low moisture content may inhibit the growth of unwanted microorganisms and may preserve flavors and aromas of the dehydrated plant material.

After the drying step 110, a moulded tea composition (or a plurality of moulded tea compositions) is formed and the moulded tea composition has a reasonable degree of mechanical stability to retain its shape. The moulded tea composition may have a moisture content in the range of about 2% to about 25% w/w, including a moisture content of less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3% or less than 2%. The moulded tea composition may have a water activity level in the range of about 0.10 and 0.50, including a water activity level of less than 0.45, less than 0.40, less than 0.35, less than 0.30, less than 0.25, less than 0.20, and less than 0.15.

Step 110 may be carried out by any suitable drying methods including convection drying, microwave-vacuum drying, infrared radiation drying, commercial food dehydrators, and the like.

For example, a commercial food dehydrator may be used for drying the cellulose-plant-material mixture contained in the mold(s). The mold(s) containing the mixture may be placed in the dehydrator. The drying temperate may be set to be between about 20° and about 55° C., including any value or subrange therebetween, e.g. 25° C., 30° C., 35° C., 40° C. and 45° C. The drying duration may range between about 6 hours and about 15 hours. During the drying process, semi-dried mixture may be removed from the mold(s) and placed back into the dehydrator to be dried further. The removal of the semi-dried mixture from the mold(s) would allow the portion that had been initially placed in the mold(s) to be exposed to hot air, allowing for a more efficient and uniformed drying process.

Excessively high drying temperature and/or excessively long drying duration may cause undesirable changes to the tea blend. For example, undesirable browning may occur when an excessively high drying temperature is used. Undesirable population reduction of probiotics may occur when an excessively high drying temperature and/or an excessively long drying duration is used.

After the drying step 110, a moulded tea composition (or a plurality of tea compositions) is formed and the moulded tea composition has a reasonable degree of mechanical stability to retain its shape. The dehydrated plant material may be visible and identifiable as ingredients in the moulded tea composition.

Additional ingredients, such as an extract, may be added to the moulded tea composition(s). For example, a flavour extract may be sprayed onto a moulded tea composition to provide a coating. The coating may create a barrier between the moulded tea composition and its surrounding environment. The barrier may protect the moulded tea composition from oxidation-related quality deterioration during storage. A moulded tea composition may be dipped into an extract. This is an example where step 106 (or another step to add additional ingredients) occurs after a moulded tea composition has been formed.

Figure 2:
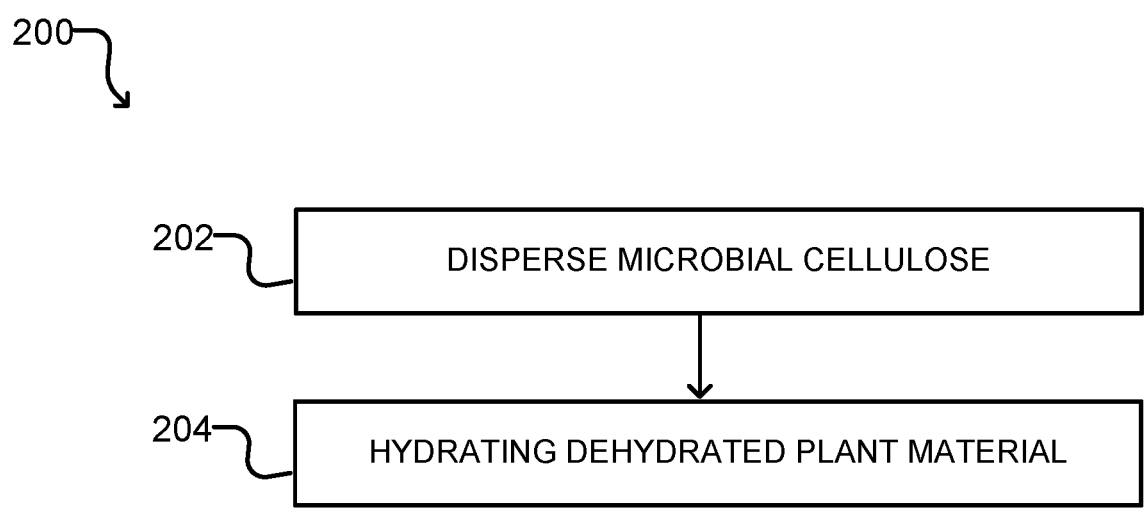
FIG. 2 is a flow diagram of an example embodiment of a method of brewing the moulded tea composition made in accordance with the method of FIG. 1.

With reference to FIG. 2, a method 200 of brewing the moulded tea composition is shown. At step 202, the moulded tea composition is soaked (or steeped) in water, e.g. superheated water (liquid water under pressure at temperatures between the usual boiling point, 100° C. and the critical temperature 374° C.), hot water (water at temperatures between 43° C. and 100° C.), room temperature water (water at temperatures between 20° C. to 43° C.), and cold water (water at temperatures between 4° C. and 20° C.) to infuse flavors, aromas, and nutrients. When the moulded tea composition is steeped in water, the microbial cellulose in the moulded tea composition becomes dispersed in hot water and no longer binds the dehydrated plant material together. The moulded tea composition may be placed in a tea strainer or a basket, which is in turn placed in a cup or a pot. Water is then poured over the moulded tea and into the cup or pot. Step 202 may be carried out in any other suitable brewing methods.

At step 204, the dehydrated plant material is allowed to hydrate. If the moulded tea composition includes tealeaves, the tealeaves can fully unfurl during the brewing process.

After the brewing process, hydrated plant material may be removed before the brewed drink is consumed.

The moulded tea composition may be pre-portioned to provide a single-serving size for brewing a cup or a pot of tea. In such embodiments, the moulded tea composition can provide the convenience typically associated with tea bags without exposing consumers to unwanted plastics and chemicals. Also, there would be no need to use any specialized tea equipment, e.g. a tea scoop or a tea scale, to measure the amount of tealeaves to be brewed.

EXAMPLES

Specific examples are described below, which are illustrative and not limiting in nature.

Example 1.0—Preparation of Kombucha Membrane

About 10 grams of black loose-leaf tea (1837 black tea, TWG Tea Company) was brewed in 1 L of tap water for 15 minutes at about 90° C.

About 100 grams of sucrose (Rogers) was added to the brewed tea.

When the brewed tea was cooled to room temperature of about 22° C., about 60 ml of a starter tea (Pure+ Kombucha) and about 50 g of kombucha membrane (Pure+ Kombucha) were added to the brewed tea.

Fermentation was carried out for 10 days at room temperature of about 22° C.

After fermentation, kombucha membrane was obtained.

Example 2.0—Pre-Processing of Kombucha Membrane

The kombucha membrane obtained from Example 1.0 was rinsed with tap water to remove any brown yeast agglomerates off its surface, leaving a smooth, while (off-white) kombucha membrane.

The rinsed kombucha membrane was cut into smaller sizes—about 20 cm or less in diameter.

The kombucha membrane pieces were placed in a mechanical blender (Hamilton Beach 53601C). Tap water in the amount of 1 ml per 1 g of kombucha membrane was added to the blender.

The kombucha membrane pieces were blended at speed 5 for 1 minute and a kombucha membrane puree was obtained.

The kombucha membrane puree was poured onto a fine double mesh filter (Update International SDF-10/SS 10¼-Inch) to drain at least a portion of the water present in the puree. The draining duration was about 15 minutes.

The average particle size of the kombucha membrane puree was determined to be between 150 uM and 840 uM.

A lemon flavoring extract (Flavor Dynamics, Aromatics & Flavors) was added in the amount of 1 ml per 10 g of drained kombucha puree.

Example 3.0—Preparation of Tea Blend

A tea blend was prepared. The tea blend included the following ingredients: loose-leaf green tea, dried ginger, dried burdock root, dried lemongrass, dried dandelion root, and turmeric powder.

The ingredients were weighed and mixed well.

Green tea extract and lemon flavoring extract were sprayed on the mixed ingredients.

Example 4.1—Production of Moulded Tea Composition

The tea blend obtained from Example 3.0 and the kombucha membrane puree obtained from Example 2.0 were mixed and combined in an 1:1 ratio by weight.

The tea-kombucha-puree mixture was packed into silicon disc-shaped molds. The tea-kombucha-puree mixture was compressed and packed down using a coffee tamper into the silicon disc-shaped molds.

The molds containing the tea-kombucha-puree mixture were placed in a commercial grade tray food dehydrator (Cabela 160 L Commercial Food Dehydrator, Model 541650.1). The temperature in the food dehydrator was set at 120° F. (about 49° C.).

After being left in the food dehydrator for two hours, the molds containing the tea-kombucha-puree mixture were taken out from the food dehydrator. The tea-kombucha-puree mixture became solidified to provide moulded tea compositions in the disc shape defined by the molds. The moulded tea compositions were removed from the molds and were placed back into the dehydrator to be dried further.

The moulded tea compositions were left in the food dehydrator set at 120° F. for another six hours.

After being dried further, the moulded tea compositions were then removed from the food dehydrator.

A lemon flavouring extract (Flavor Dynamics, Aromatics & Flavors) was sprayed onto the moulded tea compositions.

Example 4.2—Production Moulded Tea Compositions

The tea blend obtained from Example 3.0 and the kombucha membrane puree obtained from Example 2.0 were mixed and combined in an 1:2 ratio by volume.

The tea-kombucha-puree mixture was packed into silicon disc-shaped molds. The tea-kombucha-puree mixture was compressed and packed down using a coffee tamper into the silicon disc-shaped molds.

The molds containing the tea-kombucha-puree mixture were placed in a commercial grade tray food dehydrator (Cabela 160 L Commercial Food Dehydrator, Model 541650.1). The temperature in the food dehydrator was set at 120° F.

After being left in the food dehydrator for two hours, the molds containing the tea-kombucha-puree mixture were taken out from the food dehydrator. The tea-kombucha-puree mixture became solidified to provide moulded tea compositions in the disc shape defined by the molds. The moulded tea compositions were removed from the molds and were placed back into the dehydrator to be dried further. The moulded tea compositions were left in the food dehydrator set at 100° F. for another six hours.

Further being further dried, the moulded tea compositions were then removed from the food dehydrator.

A lemon flavouring extract (Flavor Dynamics, Aromatics & Flavors) was sprayed onto the moulded tea compositions.

Example 5—Moisture Analysis

The moisture content was determined using an analytical method adopted by the Association of Official Analytical Chemists (AOAC) and the experiment was carried out by FoodAssure Laboratory Ltd. located in Vancouver, British Columbia.

The moisture content of the moulded tea compositions obtained from Examples 4.1 and 4.2 was determined to be about 5%.

The moisture content of three additional moulded tea compositions was also determined. The moisture content of a Red Earl tea composition was determined to be about 3.3%. The moisture content of a Rooibos tea composition was determined to be about 7.1%. The moisture content of an Earl Grey tea composition was determined to be about 5.3%.

The moisture content of the kombucha membrane puree obtained from Example 2.0 was determined to be about 98-98.5%.

Example 5.1—Water Activity Analysis

The water activity level was determined following the MFLP-66 protocol and using the Aqualab Instrument. The water activity of the moulded tea compositions obtained from Examples 4.1 and 4.2 was determined to about 0.35.

The three additional moulded tea composition, i.e. the Red Earl tea composition, the Rooibos tea composition, and the Earl Grey tea composition, were also tested following the MFLP-66 protocol and using the Aqualab Instrument.

The water activity was determined to be about <0.25 for the Red Earl tea composition, about 0.38 for the Rooibos tea composition, and 0.34 for the Earl Grey tea composition.

Example 5.2—Microbial Analysis

Three samples, weighing about 1 g each, of the kombucha membrane puree obtained from Example 2.0 were prepared. The samples were plated onto general purpose agar media. The microbial load was determined to be about 51 CFU, 70 CFU, and 60 CFU. Gram-positive bacteria was isolated and rod-shaped bacteria was observed under the microscope.

A sample, weighing bout 6.6 g, of the kombucha membrane puree obtained from Example 2.0 was collected. The sample was steeped in about 150 mL hot water at about 78° C. for 2-3 minutes. 100 uL of steeped puree was plated onto general purpose agar media in triplicates. The microbial load was determined to be about 4 CFU and 1 CFU.

Example 6—Brewing of Moulded Tea Compositions

The moulded tea compositions obtained from Examples 4.1 and 4.2 were brewed.

A single moulded tea composition was placed directly in a tea strainer and the tea strainer was placed in a cup. Hot water of about 90° C. was poured directly over the tea composition and into the cup.

The moulded tea composition was steeped in hot water for about 3 minutes. The moulded tea composition became hydrated and dispersed. The tealeaves contained in the moulded tea composition were observed to fully unfurl in the cup.

Example 7.0—Preparation of Microbial Cellulose

Examples 7 and 8 aim to show that other microbial cellulose (other than kombucha membrane) will also work.

About 30 g/L of glucose (Sigma Aldrich) and about 10 g/L of a yeast extract powder (Sigma Aldrich) were used to provide a seed culture medium. *Acetobacter xylinum* (ATCC 23769) was cultured in the seed culture medium at 30° C. and aerated for 5 days to provide a seed culture.

A culture medium was prepared with 30 g/L of glucose (Sigma Aldrich), 10/L of a year extract powder (Sigma Aldrich), 10 g/L of $Na_2HPO_4$ (Sigma Aldrich), and 5 g/L of citrate acid (Sigma Aldrich). The culture medium was then sterilized under 121° C. for 30 minutes.

The culture medium was inoculated with the seed culture and to each 100 ml of the culture medium, about 10 ml of the seed culture was added.

*Acetobacter xylinum* was statically fermented for 10 days at 25° C.

Following the fermentation process, microbial cellulose film was collected and washed with water.

The microbial cellulose film was placed in a mechanical blender (Hamilton Beach 53601C). Tap water in the amount of 1 ml per 1 g of the microbial cellulose film was added to the blender.

The microbial cellulose film was blended at speed 5 for 1 minute and a microbial cellulose puree was obtained.

The microbial cellulose puree was poured onto a fine double mesh filter (Update International SDF-10/SS 10¼-Inch) to drain at least a portion of the water present in the puree. The draining duration was 20 minutes.

Example 8.0—Production of Moulded Tea Compositions

The tea blend obtained from Example 3.0 and the microbial cellulose puree obtained from Example 7.0 were mixed and combined in an 1:1 ratio.

The mixture was packed into silicon disc-shaped molds. The mixture was compressed and packed down manually by hand into the silicon disc-shaped molds.

The molds containing the tea-cellulose-puree mixture were placed in a commercial grade tray food dehydrator (Cabela 160 L Commercial Food Dehydrator, Model 541650.1). The temperature in the food dehydrator was set at 120° F.

After being left in the food dehydrator for two hours, the molds containing the mixture were taken out from the food dehydrator. At this stage, the mixture became solidified to provide moulded tea compositions in the disc shape defined by the molds. The moulded tea compositions were removed from the molds and placed back into the dehydrator to be dried further. The moulded tea compositions were left in the food dehydrator for another six hours.

The further dried moulded tea compositions were then taken out from the food dehydrator.

A lemon flavouring extract (Flavor Dynamics, Aromatics & Flavors) was sprayed onto the moulded tea compositions.

Example 9.0—Comparative Review of Microbial Cellulose and Plant-Based Cellulose

Hussain et al. in Production of bacterial cellulose from industrial wastes: a review. *Cellulose*, 26(5), 2895-291, reported that microbial cellulose and plant-based cellulose have different physical and mechanical properties. For example, Hussain et al. reported that microbial cellulose is more chemically pure in comparison to plant-based cellulose. In contrast to plant-based cellulose, microbial cellulose contains no lignin, hemicellulose or pectin. Microbial cellulose is often naturally non-toxic and has a relatively long history of human consumption as food. Also, Rei et al. in Plant and bacterial cellulose: production, chemical structure, derivatives and applications. *Orbital: The Electronic Journal of Chemistry*, 11(5), 321-329, reported that the fibrils of the microbial cellulose are about 100 times smaller than that of plant-based cellulose. This small size of fibrils enables microbial cellulose to have a higher level of flexibility and moldability, a higher water holding capacity, higher porosity, and a high surface area to volume ratio than plant-based cellulose.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Without limiting the foregoing, some embodiments of the present invention encompass the following aspects:

A. A method of making a moulded tea composition, the method comprising:
    combining microbial cellulose with dehydrated plant material to produce a mixture;
    moulding the mixture into a desired shape; and
    drying the moulded mixture to make the moulded tea composition.

B. The method of aspect A, wherein the microbial cellulose binds the dehydrated plant material and holds the dehydrated plant material in the desired shape.

C. The method of aspect B, wherein the microbial cellulose comprises kombucha membrane.

D. The method of aspect C, wherein:
the moulded tea composition comprises probiotics; and
at least a portion of the probiotics is provided by the kombucha membrane.

E. The method of aspect C, further comprising: washing the kombucha membrane.

F. The method of aspect C, further comprising: reducing an average particle size of the kombucha membrane prior to combining the kombucha membrane with the dehydrated plant material.

G. The method of aspect E, wherein:
the average particle size of the kombucha membrane is reduced by using mechanical shearing.

H. The method of aspect G, wherein:
the average particle size of the kombucha membrane is reduced to between 10 μm and 100 μm.

I. The method of any one of aspects F to H, further comprising: drying the particle-size-reduced kombucha membrane.

J. The method of aspect B, further comprising: placing the mixture in a mold to mould the mixture into the desired shape.

K. The method of aspect J, further comprising: compressing the mixture in the mold.

L. The method of aspect B, further comprising: adding an extract to the mixture.

M. The method of aspect B, further comprising: adding an extract to the microbial cellulose.

N. The method of aspect B, further comprising: adding an extract to the dehydrated plant material.

O. The method of aspect B, further comprising: spraying an extract onto the moulded tea composition.

P. The method of aspect B, further comprising: adding probiotics, macronutrients, micronutrients, and/or trace minerals to the mixture.

Q. The method of aspect B, further comprising: adding probiotics, macronutrients, micronutrients, and/or trace minerals to the microbial cellulose.

R. The method of aspect B, further comprising: adding probiotics, macronutrients, micronutrients, and/or trace minerals to the dehydrated plant material.

S. The method of any one of aspects A to R, further comprising evenly mixing the dehydrated plant material.

T. The method of any one of aspects A to S, wherein the ratio of the microbial cellulose to the dehydrated plant material in the mixture is between 0.5:1 and 10:1 on a wet basis and before the mixture is dried.

U. The method of any one of aspects A to T, wherein the amount of the microbial cellulose in the moulded tea composition is in the range of 0.1% to 20% on a dry matter basis.

V. The method of any one of aspects A to T, wherein the moulded mixture is dried for 6 hours to 15 hours at a drying temperature between 20° C. and 55° C.

W. A moulded tea composition comprising:
dehydrated plant material; and
microbial cellulose as a binder for the dehydrated plant material.

X. The moulded tea composition of aspect W, wherein the microbial cellulose comprises a kombucha membrane.

Y The moulded tea composition of aspect X, wherein:
the moulded tea composition comprises probiotics; and
at least a portion of the probiotics is provided by the kombucha membrane.

Z. The moulded tea composition of any one of aspects W to Y, wherein the dehydrated plant material comprises tealeaves.

AA. The moulded tea composition of any one of aspects W to Z, wherein the moulded tea composition is pre-portioned to provide a single-serving size for brewing a cup of tea.

BB. The moulded tea composition of any one of aspects W to AA, further comprising an extract.

CC. The moulded tea composition of any one of aspects W to BB, wherein the amount of the microbial cellulose in the moulded tea composition is in the range of 0.1% to 20% on a dry matter basis.

DD. The moulded tea composition of any one of aspects W to CC, further comprising macronutrients, micronutrients, and/or trace minerals.

EE. The moulded tea composition of any one of aspects W to DD, wherein the moulded tea composition is shaped as a cylindrical disc, a cone, a sphere, a cube, or a rectangular prism.

FF. The moulded tea composition of any one of aspects W to DD, wherein the moulded tea composition is shaped as a bar comprising separable squares.

GG. The moulded tea composition of aspect FF, wherein each one of the squares provides a single-serving portion for brewing a cup of tea.

HH. The moulded tea composition of any one of aspects W to GG, wherein when the moulded tea composition is brewed, the microbial cellulose disperses and thereby frees the dehydrated plant material from being bond together.

II. The moulded tea composition of any one of aspects W to HH, where an average particle size of the microbial cellulose is between 10 μm and 1000 μm.

JJ. The moulded tea composition of any one of aspects W to II, wherein the dehydrated plant material is visible and identifiable as ingredients in the moulded tea composition.

KK. The moulded tea composition of any one of aspects W to JJ, further comprising an oxidation-resistant coating.

LL. The moulded tea composition of aspect KK, wherein the oxidation-resistant coating comprises a flavor extract.

MM. Use of microbial cellulose as a binder to hold dehydrated plant material in a desirable shape.

NN. Use of aspect MM, wherein the microbial cellulose comprises kombucha membrane.

OO. Use of either one of aspects MM or NN, wherein the dehydrated plant material comprises tealeaves.

The invention claimed is:

1. A method of making a molded tea composition, the method comprising:
combining microbial cellulose with dehydrated plant material to produce a mixture, wherein a ratio of the microbial cellulose to the dehydrated plant material is between 0.5:1 to 10:1, and wherein the microbial cellulose is a microbial-derived cellulous membrane produced by *Acetobacter* microorganisms, the membrane having an average particle size between 10 μm and 1000 μm;
molding the mixture into a desired shape; and
drying the molded mixture to make the molded tea composition;
wherein the molded tea composition has a moisture content in the range of 2% to 25%;
wherein the molded tea composition has a water activity level in the range of 0.10 to 0.50; and wherein the microbial cellulose binds the dehydrated plant material and holds the dehydrated plant material in the desired shape.

2. The method of claim 1, wherein an amount of the dehydrated plant material present in the molded tea composition is between about 80% and about 99.9%.

3. The method of claim 1, wherein the microbial cellulose comprises kombucha membrane.

4. The method of claim 3, wherein:
the molded tea composition comprises probiotics; and
at least a portion of the probiotics is provided by the kombucha membrane.

5. The method of claim 3, further comprising: reducing an average particle size of the kombucha membrane prior to combining the kombucha membrane with the dehydrated plant material.

6. The method of claim 5, further comprising:
drying the particle-size-reduced kombucha membrane.

7. The method of claim 5, wherein, following the drying, the amount of dehydrated plant material present in the moulded tea composition is between about 80% to about 99.9%.

8. The method of claim 5, wherein:
the average particle size of the kombucha membrane is reduced by using mechanical shearing.

9. The method of claim 8, further comprising:
adding probiotics to the mixture; and
adding a flavor extract and/or a botanical extract to one or more of the mixture, the microbial cellulose and/or the dehydrated plant material, or spraying the flavor extract and/or the botanical extract onto the molded tea composition.

10. The method of claim 8, further comprising:
adding probiotics and a flavor extract and/or a botanical extract to the mixture;
placing the mixture in a mold to mold the mixture into the desired shape;
compressing the mixture in the mold.

11. The method of claim 8, further comprising:
adding a flavor extract and/or a botanical extract to the microbial cellulose;
adding probiotics to the mixture;
placing the mixture in a mold to mold the mixture into the desired shape; and
compressing the mixture in the mold.

12. The method of claim 8, further comprising:
adding a flavor extract and/or a botanical extract to the dehydrated plant material;
adding probiotics to the mixture;
placing the mixture in a mold to mold the mixture into the desired shape; and
compressing the mixture in the mold.

13. The method of claim 1, further comprising:
placing the mixture in a mold to mold the mixture into the desired shape.

14. The method of claim 13, further comprising:
compressing the mixture in the mold.

15. The method of claim 1, further comprising:
adding an extract to the mixture.

16. The method of claim 1, further comprising:
adding an extract to the microbial cellulose.

17. The method of claim 1, further comprising:
adding an extract to the dehydrated plant material.

18. The method of claim 1, further comprising:
spraying an extract onto the molded tea composition.

19. The method of claim 1, further comprising:
adding probiotics to the mixture.

20. The method of claim 1,
wherein the molded tea composition comprises probiotics and one or more of a flavor extract, macronutrients, micronutrients, trace minerals and/or a botanical extract;
wherein at least a portion of the probiotics is provided by the kombucha membrane; and
wherein the dehydrated plant material comprises tea leaves.

* * * * *